Patented Sept. 16, 1941

2,256,033

UNITED STATES PATENT OFFICE 2,256,033

METHOD OF MAKING REFRACTORY BODIES OF TIN OXIDE

Dan McLachlan, Jr., Corning, N. Y., assignor to Corning Glass Works, Corning, N. Y., a corporation of New York No Drawing. Application May 18, 1940, Serial No. 336,038

4 Claims. (Cl. 25—156)

This invention relates to refractories for use in contact with molten glass and more particularly to refractory bodies composed of or containing substantial amounts of tin oxide.

In a pending application, Serial Number 148,784, filed June 17, 1937, by Harrison P. Hood, it is shown that molded refractory bodies composed of tin oxide are particularly suitable for contact with molten glass and are highly resistant both to the corrosive action of melting batch ingredients and to the erosion of flowing molten glass. The application further shows that molded bodies of tin oxide have a relatively high but slow shrinkage on firing which persists even after repeated firing and that the introduction into the tin oxide batch of a small amount of a compound of a metal of the first, seventh and eighth periodic groups, preferably copper, silver, gold, cobalt, iron, nickel or manganese, accelerates such shrinkage and causes it to be substantially complete in a relatively short time of firing.

I have found that in slip casting refractory bodies containing tin oxide, the introduction of soluble salts of the above recited metals into the slip for the purpose of accelerating shrinkage of the casting when fired has an objectionable effect upon the characteristics of the slip and results in castings of inferior quality. As a result it has been impossible by slip casting to obtain the maximum benefits which it is possible to derive from tin oxide refractory bodies containing shrinkage promoting or accelerating agents.

The primary object of this invention is a simple and easy method of incorporating shrinkage promoting agents into refractory bodies containing tin oxide.

Another object is to slip cast bodies containing tin oxide and to incorporate therein a shrinkage promoting agent without detracting from the valuable properties of the final body when fired.

The above and other objects may be accomplished by practicing my invention which embodies among its features molding a batch containing a substantial amount of tin oxide to form a refractory body, firing the body at a temperature and for a time sufficient to sinter it to a coherent porous mass, impregnating the porous body with a solution containing a shrinkage promoting agent in an amount equivalent, as oxide, to .5%–2% of the weight of the body in a volume of the solution substantially equal to the pore space of the body, drying the impregnated body and firing it in an oxidizing atmosphere at 1300°–1500° C.

In practicing the invention the refractory batch, which may consist of stannic oxide alone or a mixture thereof with another refractory oxide or oxides including clays, is molded in known manner as by pressing under high pressure in a steel mold or preferably by slip casting in a porous mold, after which it is air dried and fired to about 1000° C., which temperature I have found sufficient to sinter the body to a coherent porous mass. The porous body is then impregnated with a solution of a shrinking agent consisting preferably of a salt of one of the above recited metals. The amount of shrinking agent introduced, calculated as the oxide of the metal, should be about .5% to 2% of the weight of the body. To accomplish this the concentration of the solution should be such that a volume thereof equal to the volume of the pore space of the body will contain an amount of the salt equivalent to the required amount of the metal oxide. The pore space or porosity of the body may be determined by measuring the volume of liquid required to fill the pores.

The impregnated body is air dried and fired in an oxidizing atmosphere to a temperature of 1300°–1500° C. in increments of about 200°, each temperature being maintained for about one hour.

For reasons unknown, the salts comprising the shrinking agents, when introduced into such a refractory body in the amount and in the manner described above, do not effloresce or creep to the surface when the body is dried and fired. The composition of the body is therefore substantially the same throughout and shrinkage occurs evenly and uniformly greatly accelerated by the introduction of the agent.

I claim:

1. Method of making a refractory body which comprises molding a batch containing a substantial amount of stannic oxide, firing the molded body at a temperature and for a time sufficient to sinter it to a coherent porous mass, impregnating the porous body with a solution containing a salt of a metal which when raised to sintering temperatures will accelerate the shrinkage of the refractory, the amount of metal introduced into the body being equivalent, as oxide, to .5%–2% of the weight of the body, drying the impregnated body and firing it in an oxidizing atmosphere at 1300°–1500° C.

2. Method of making a refractory body from material containing a substantial amount of finely divided stannic oxide which comprises slip casting the material in a porous mold, firing the molded body at a temperature and for a time sufficient to sinter it to a coherent porous mass, impregnating the porous body with a solution containing a salt of manganese, a volume of the solution substantially equal to the pore space of the body containing an amount of the salt equivalent, as oxide, to .5%–2% of the weight of the body, drying the impregnated body and firing it in an oxidizing atmosphere at 1300°–1500° C.

3. Method of molding refractory material containing a substantial amount of finely divided stannic oxide which comprises slip casting the material in a porous mold, firing the molded body at a temperature and for a time sufficient to sinter it to a coherent porous mass, impregnating the porous body with a solution containing a copper salt, a volume of the solution substantially equal to the pore space of the body containing an amount of the salt equivalent, as oxide, to .5%–2% of the weight of the body, drying the impregnated body and firing it in an oxidizing atmosphere at 1300°–1500° C.

4. Method of making a refractory body from material containing a substantial amount of finely divided stannic oxide which comprises slip casting the material in a porous mold, firing the molded body at a temperature and for a time sufficient to sinter it to a coherent porous mass, impregnating the porous body with a solution containing a salt of iron, a volume of the solution substantially equal to the pore space of the body containing an amount of the salt equivalent, as oxide, to .5%–2% of the weight of the body, drying the impregnated body and firing it in an oxidizing atmosphere at 1300°–1500° C.

DAN McLACHLAN, Jr.